(12) United States Patent
Fagan

(10) Patent No.: US 6,998,989 B2
(45) Date of Patent: Feb. 14, 2006

(54) ENHANCED ANIMAL HANDLING DEVICE

(76) Inventor: Robin Christopher Feltrim Fagan, 83 Te Kurni Road, Te Kuiti (NZ)

(*) Notice: Subject to any disclaimer, the term of this patent is extended or adjusted under 35 U.S.C. 154(b) by 46 days.

(21) Appl. No.: 10/459,838

(22) Filed: Jun. 12, 2003

(65) Prior Publication Data

US 2004/0035370 A1    Feb. 26, 2004

(30) Foreign Application Priority Data

Jun. 14, 2002 (NZ) .................................. 519622

(51) Int. Cl.
     *G08B 23/00*      (2006.01)
(52) U.S. Cl. ................ 340/573.3; 340/556; 340/573.1; 119/452; 119/457; 119/473; 119/524
(58) Field of Classification Search ............ 340/573.1, 340/573.3, 556, 557; 119/452, 457, 473, 119/524, 51.02, 908
See application file for complete search history.

(56) References Cited

U.S. PATENT DOCUMENTS

| | | | | |
|---|---|---|---|---|
| 5,979,365 A | * | 11/1999 | Sorraghan et al. | 119/524 |
| 6,199,514 B1 | * | 3/2001 | Jubinville et al. | 119/728 |
| 6,357,395 B1 | * | 3/2002 | Nilsson | 119/524 |
| 6,609,480 B1 | * | 8/2003 | Daniels et al. | 119/752 |

FOREIGN PATENT DOCUMENTS

GB      2209455 A    *    5/1989

* cited by examiner

*Primary Examiner*—Daniel Wu
*Assistant Examiner*—Travis R. Hunnings
(74) *Attorney, Agent, or Firm*—Greer, Burns & Crain, Ltd.

(57) ABSTRACT

An animal handling device, including at least one securing device, and a primary sensor system, and a secondary sensor system characterised in that both the primary and secondary sensor systems must be simultaneously activated in order to trigger the securing device to hold the animal.

15 Claims, 2 Drawing Sheets

ENHANCED ANIMAL HANDLING DEVICE

TECHNICAL FIELD

This invention relates to an enhanced animal handling device.

In particular, this invention relates to an enhanced animal handling device for use in an animal crush assembly.

However, this should not necessarily be seen to be a limitation on the present invention in any way as the present invention can be used to control the movement of an animal within any suitable animal control system or environment.

BACKGROUND ART

Reference throughout this specification shall be made to the use of the present invention for handling domesticated animals such as cattle, sheep and deer, although it should be appreciated that the present invention can be applied to other animals.

In particular, reference to the present invention shall be made to its use in animal directing devices such as sheep and cattle races and for the purpose for securing an animal and applying a treatment to the animal.

It should be noted however that the description of the present invention is given by way of example only and should not be seen as limiting the present invention in any way.

It is often desirable to be able to hold animals so that a treatment can be applied to the animal, or various measurements taken of the animal, such as its weight.

Using sheep as an example, it is common to bolus, drench, take blood, apply and read ear tags, check teeth and so forth.

Various devices are known which are used for the above purpose, however these devices have a number of problems associated with them.

New Zealand Patent No. 209221 relates to an animal crush that has side plates which can be moved with respect to each other by pulling a flexible restraint, which can be used in the shearing or crutching of sheep.

The resultant action of the side plate movement holds the sheep in position in order that it can be administrated to.

One of the disadvantages of this construction is that some force is required to manually pull the restraint. Further, this process is not very efficient if used in a sheep race situation as the manual operation of the side plates takes some time.

Another problem is that the floor of this construction is a considerable distance above the ground and if used in a sheep race it could impede the flow of animals through the race.

Deer crushes are known, such as those described in New Zealand Patent No. 196738, which are generally operated manually, although in some embodiments other means of operation are used.

Deer crushes however cannot be used in a race type situation as they work by having the legs of the animal dangling free below the crush and this would impede the flow of animals through the race and hence impairing the efficiency of its' operation.

Sheep weigh-crates are known which have sides that move parallel with respect to each other.

However, their operation makes it difficult for the animals to be quickly held and released and sheep weigh-crates typically have end gates in addition to side panels which can hinder access to the animal within the crate as well as interrupt the passage of animals through the system.

New Zealand Patent No. 248929 relates to an animal handling device which comprises a fixed wall and a pivotable wall, there is a ram connected to the pivotable wall and when activated it will swing the pivotable wall in contact with the animal thereby securing the animal in its present position.

Whilst this invention overcomes most of the drawbacks with the other animal handling systems currently available, it still relies on an operator to activate the ram to move the pivotable wall, this means that under normal operating conditions the animals are generally secured at random points throughout the animal handling device and some can even pass through without being secured.

In order for the animal handling device to be efficient it is necessary that all animals are secured, in turn by the animal handling device and it is preferable that the animals are secured at roughly the same position within the animal handling device as this will remove the necessity for the operator to move to different positions with whatever equipment is necessary for the administrations at hand.

A great improvement over the systems previously used was disclosed in New Zealand Patent Application No. 507346 which relates to an animal handling device that incorporates a sensor system to detect when an animal is in the required position and to activate the handling device in order to secure the animal before it can change position.

Whilst this system greatly improved the consistency of the positions in which the series of animals were held (and thereby reduce the stress on both the operator and the equipment being used), it did however still have one restriction in that if an animal was to move backwards once it had been released by the handling device it was possible for the same animal to retrigger the apparatus as it once again moves forwards.

This was found to be an inconvenience for the operator as they would then have to manually override the system in order to release the animal and persuade it to move forwards away from the equipment.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the above problem or at least to provide the public with a useful choice.

Further objects and advantages of the present invention will become apparent from the following description which is given by way of example only.

DISCLOSURE OF INVENTION

According to one aspect of the present invention there is provided an animal handling device, including,
at least one securing device, and
a primary sensor system, and
a secondary sensor system
characterised in that
both the primary and secondary sensor systems must be simultaneously activated in order to trigger the securing device to hold the animal.

According to another aspect of the present invention there is provided an animal handling device configured to be able to secure or retain an animal including,
at least one securing device, and
a primary sensor system, and
a secondary sensor system
characterised in that
on release of the animal, the animal handling device will not be able to retrigger until after the secondary sensor system is deactivated before the primary sensor system is deactivated.

Reference throughout this specification shall now be made to the use of the present invention as an animal crush.

However, this should not be seen to be a limitation on the present invention in any way as the present invention is equally suitable for use in other embodiments where the controlled handling of animals is required.

In some preferred embodiments of the present invention, the incorrect sequence of activation of the sensor systems will initiate an alarm signal that can be used to alert the operator to the fact that an animal is moving backwards after being released by the animal handling device.

It is envisaged that the alarm can activate an audible or visual signal, such as a bell, buzzer, claxon, illuminating a light, flashing or strobing a light, or any other suitable output desired by the operator of the equipment.

It is envisaged that the horizontal displacement between a sensor from the primary sensor system and a sensor from the secondary sensor system will ensure that the operator does not accidentally trigger the animal handling device by inadvertently activating a sensor from each sensor system.

In preferred embodiments of the present invention the securing device is one of the animal crush side panels moving with respect to the other side panel in order to hold the animal between the two side panels.

Examples of various types of power movement means, or power devices, include pneumatic or hydraulic rams, electric motors, engines or any other powered device.

The term "sensor system" should be understood to mean any system including at least one sensor, wherein the movement or position of an animal can be used to trigger the circuitry in order to activate or deactivate the power device.

It should be appreciated that the circuitry can be controlled by other means and not just by a sensor e.g.; a manual override assembly.

It should also be understood that the present invention incorporates all of the advantages within New Zealand Patent Application No. 275165 and the sensor control activation system disclosed in New Zealand Patent Application No. 507346.

It should also be appreciated that the scope of present invention is intended to cover other animal securing methods and assemblies such as by activating a gate to impede the animal's movement.

In preferred embodiments of the present invention there will be at least two sensors in each sensor system, either of which can be used to determine when the animal within the handling device is in the correct position.

In some preferred embodiment of the present invention the restrained animal is released automatically once the administrating to the animal has been completed.

This will be enacted by the equipment being used to administer to the animal, it will on completion of the required task send an appropriate signal to the animal handling device instructing the device to release the animal.

In other preferred embodiments of the present invention the restrained animal is released when the operator manually triggers the handling device sensor system instructing it that the animal is to be released.

It is preferred to use at least two sensors in each sensor system which are in different vertical positions in order to ensure that the animal is in the correct position:
whether its head is up or down as with only one sensor it is possible for the animal to have its head in a position where it will not always activate the sensor, and
to ensure all animals activate the sensor systems when the animal is in the correct position no matter how small or large the animal may be.

According to another aspect of the present invention there is provided a method of handling an animal, including
at least one securing device, and
a primary sensor system, and
a secondary sensor system,
characterised by the steps of
a) allowing an animal to enter the animal handling device to a point where it triggers at least one sensor from both the secondary sensor system and the primary sensor system, and
b) using the sensor systems to trigger the securing device in order to hold the animal in the desired position, and
c) releasing the animal when desired, and
d) only resetting the device when the secondary sensor system is deactivated before the primary sensor system is deactivated.

It is envisaged that within preferred embodiments of the present invention the sensor systems will incorporate infrared sensors.

This should not however be seen to be a limitation on the present invention in any way, as in other embodiments other sensor types can be used for example ultrasonic, LED's etc.

BRIEF DESCRIPTION OF DRAWINGS

Further aspects of the present invention will now be described by way of example only and with reference to the accompanying drawings in which.

BEST MODES FOR CARRYING OUT THE INVENTION

Figure 1:
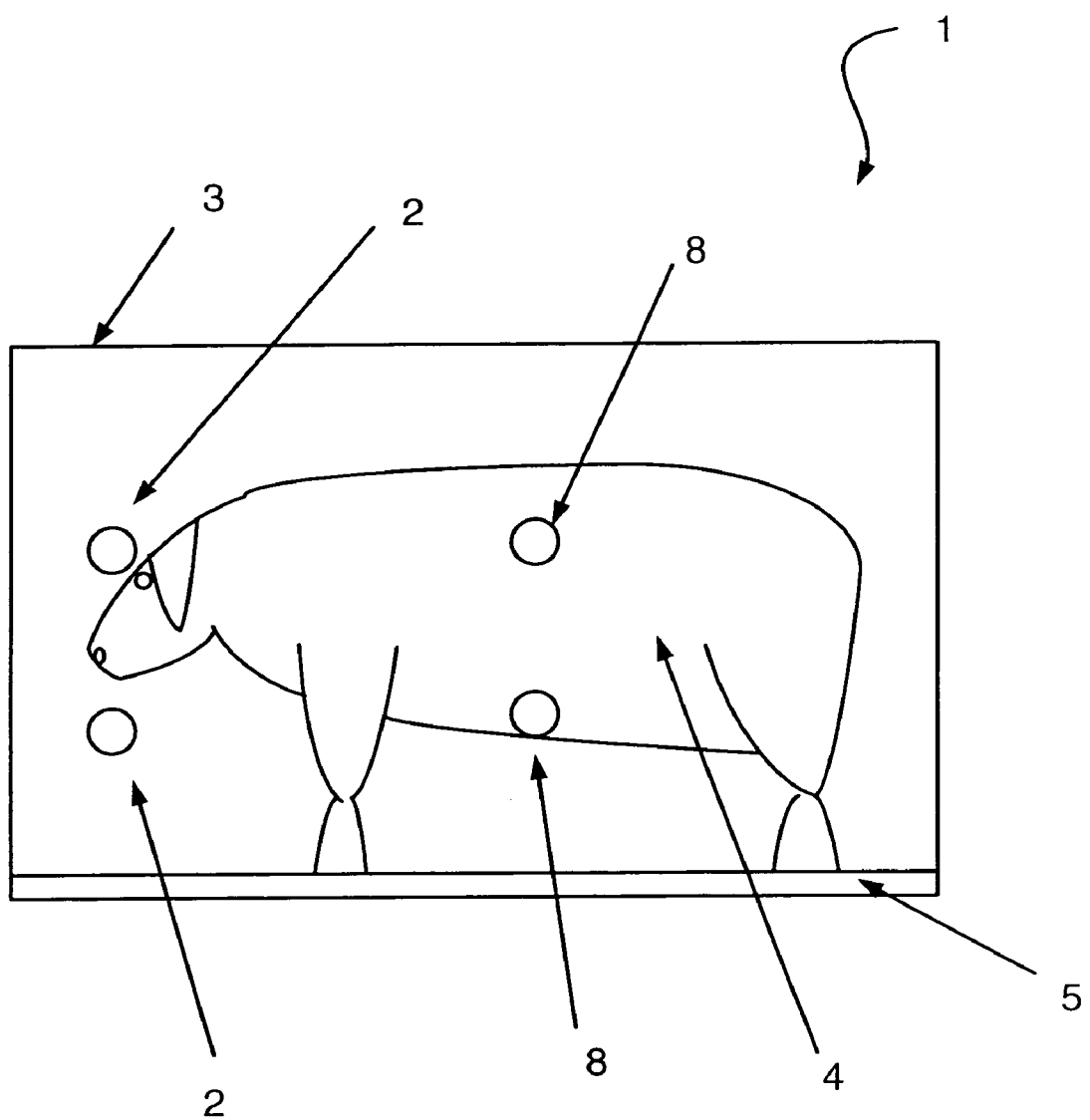
FIG. 1 is a diagrammatic representation of a side view of one preferred embodiment of the present invention.
Figure 2:
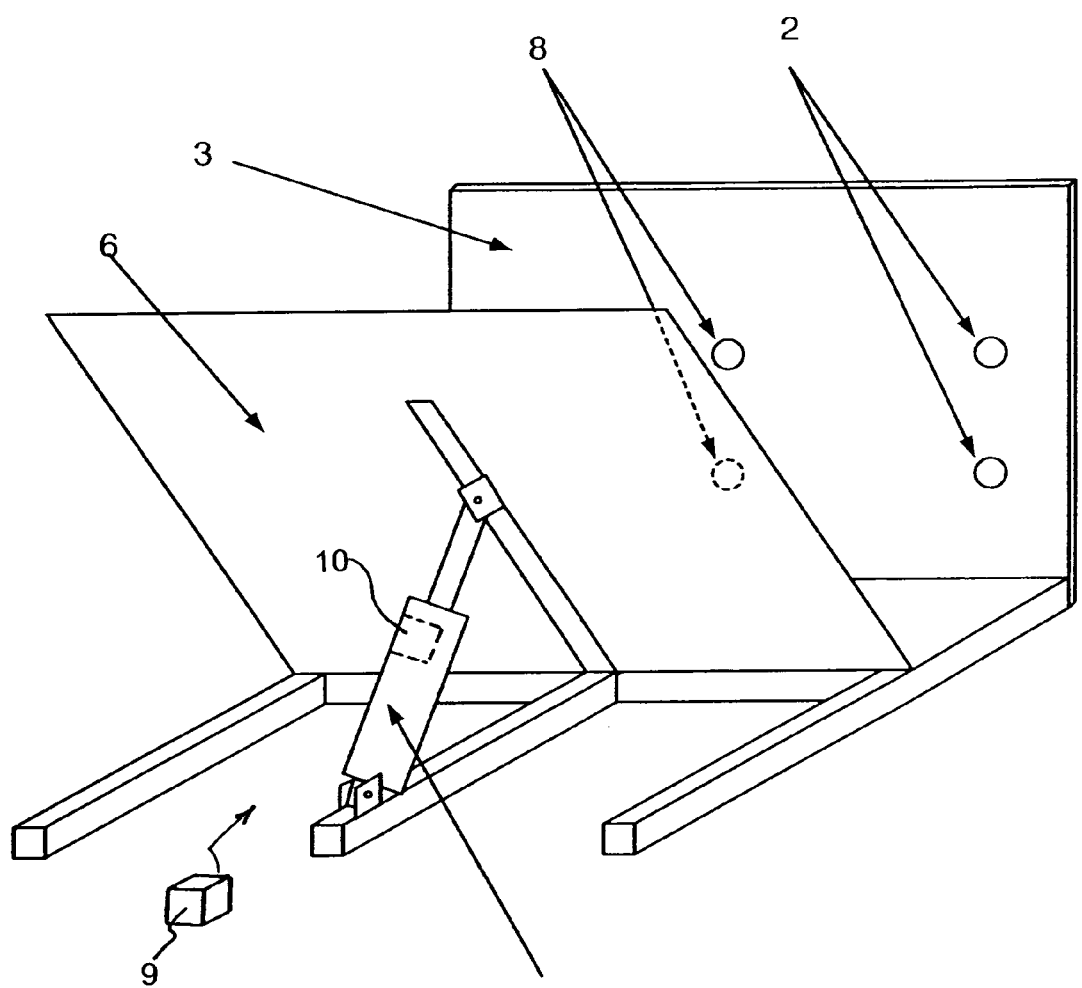
FIG. 2 is a diagrammatical perspective view of one preferred embodiment of the present invention.

With reference to the figures there is illustrated an enhanced animal handling device, generally indicated by arrow 1.

The primary sensor system sensors (2) and the secondary sensor system sensors (8) are attached to the side wall (3) of the animal handling device (1).

The sensors within each sensor system (2) and (8) are located in such a position that the animal (4) will activate at least one sensor from each system (2) and (8) whether the animal's (4) head is in a upwards or downwards position.

The animal (4) progresses along the floor (5) of the animal handling device (1) until it activates at least one of the sensors from the secondary sensor system (8) as well as one of the sensors from the primary sensor system (2).

This sequence of events will activate the power device (7) in order that it moves the tilting at least one side wall or panel (6) into its closed position.

On completion of the administrations to the animal (4), a signal is sent to the sensor control system (not illustrated) which will subsequently activate the power device (7) in order that it moves the tilting side wall (6) back into its open position. Alternately, the signal may originate from an external piece of equipment (9) or a manual override assembly (10).

The sensor control system then monitors the sequence of deactivation and activation of the sensor systems (2, 8) in order to ensure that the secondary sensor system (8) is deactivated before the primary sensor system (2) to ensure the animal has left the enhanced animal handling device in a forward direction.

The animal handling device will not reset until this sequence of events has been enacted in order to ensure that it does not resecure an animal that has left the animal handling device backwards and subsequently once again move forwards.

Aspects of the present invention have been described by way of example only and it should be appreciated that modifications and additions may be made thereto without departing from the scope thereof as defined in the appended claims.

What I claim is:

1. An animal handling device, comprising:
   at least one securing device which includes at least one pivoting side panel;
   a primary sensor system, containing at least two vertically displaced sensors configured to sense the presence of an animal whether it has its head in either an up or a down position; and
   a secondary sensor system, wherein the secondary sensor system must be activated before the primary sensor system is activated, and the secondary sensor system must remain activated at the same time that the primary sensor system is activated to trigger the securing device to hold the animal;
   on release of the animal, the handling device will not be able to retrigger until after the secondary sensor system is deactivated before the primary sensor system is deactivated, preventing the animal securing device retriggering in the case of an animal moving backwards out of the securing device.

2. An animal handling device as claimed in claim 1 wherein the incorrect sequence of activation of the sensor systems initiates an alarm signal.

3. An animal handling device as claimed in claim 2 wherein the alarm is configured to activate an audible signal.

4. An animal handling device as claimed in claim 2 wherein the alarm is configured to activate a visual signal.

5. An animal handling device as claimed in claim 1 wherein the primary sensor system is horizontally displaced from the secondary sensor system.

6. An animal handling device as claimed in claim 1 wherein the animal handling device is configured as an animal crush.

7. An animal handling device as claimed in claim 6 wherein the securing device is one of at least one animal crush side panels moving with respect to another said side panel.

8. An animal handling device as claimed in claim 1 wherein the securing device is configured to have a manual override assembly.

9. An animal handling device as claimed in claim 1 wherein each sensor system consists of at least two sensors.

10. An animal handling device as claimed in claim 9 wherein at least two sensors in each sensor system are orientated in different vertical positions.

11. An animal handling device as claimed in claim 1 wherein the animal handling device is configured so that the restrained animal is released automatically once a process of administering to the animal has been completed.

12. An animal handling device as claimed in claim 1 wherein the animal handling device is configured to release a restrained animal on the receipt of an appropriate signal from an external piece of equipment.

13. An animal handling device as claimed in claim 1 wherein the animal handling device is manually triggered to release a restrained animal.

14. An animal handling device as claimed in claim 1 wherein the sensor systems incorporate infrared sensors.

15. A method of handling an animal, including at least one securing device which includes at least one pivoting side panel, and a primary sensor system, containing at least two vertically displaced sensors configured to sense the presence of an animal whether it has its head in either an up or a down position, and a secondary sensor system, comprising the steps of:
   a) allowing an animal to enter the animal handling device to a point where it triggers at least one sensor from both the secondary sensor system and the primary sensor system simultaneously,
   b) using the sensor systems to trigger the securing device to restrain an animal,
   c) releasing the restrained animal on receipt of an appropriate signal, and
   d) resetting the animal handling device when the secondary sensor system is deactivated before the primary sensor system is deactivated, wherein the resetting of the animal handling device prevents retriggering in the case of an animal moving backwards out of the handling device.

* * * * *